(12) United States Patent
Marini

(10) Patent No.: US 11,279,101 B2
(45) Date of Patent: Mar. 22, 2022

(54) SENSING SEALANT LIQUID CONTAINER AND INFLATABLE ARTICLE REPAIR KIT COMPRISING THE SAME

(71) Applicant: TEK GLOBAL S.R.L., Pesaro (IT)

(72) Inventor: Maurizio Marini, Pesaro (IT)

(73) Assignee: TEK GLOBAL S.R.L., Pesaro (IT)

(*) Notice: Subject to any disclaimer, the term of this patent is extended or adjusted under 35 U.S.C. 154(b) by 634 days.

(21) Appl. No.: 16/305,223

(22) PCT Filed: Jun. 8, 2017

(86) PCT No.: PCT/IB2017/053399
§ 371 (c)(1),
(2) Date: Nov. 28, 2018

(87) PCT Pub. No.: WO2017/212439
PCT Pub. Date: Dec. 14, 2017

(65) Prior Publication Data
US 2020/0316885 A1    Oct. 8, 2020

(30) Foreign Application Priority Data

Jun. 8, 2016 (IT) .................. 102016000058691

(51) Int. Cl.
*B29C 73/16* (2006.01)
*B60S 5/04* (2006.01)

(52) U.S. Cl.
CPC ............ *B29C 73/166* (2013.01); *B60S 5/046* (2013.01)

(58) Field of Classification Search
CPC .... B29D 30/0685; B29C 73/166; B60S 5/046
See application file for complete search history.

(56) References Cited

U.S. PATENT DOCUMENTS

| 7,789,110 B2* | 9/2010 | Marini | B60S 5/046 |
| | | | 141/38 |
| 8,181,676 B2* | 5/2012 | Steele | B60C 29/062 |
| | | | 141/38 |
| 8,251,105 B2* | 8/2012 | Lolli | B29C 73/166 |
| | | | 141/38 |
| 8,491,275 B2* | 7/2013 | Lolli | B29C 73/166 |
| | | | 417/313 |
| 8,746,292 B2* | 6/2014 | Lolli | B60S 5/00 |
| | | | 141/38 |

(Continued)

FOREIGN PATENT DOCUMENTS

| CN | 101437669 | 5/2009 |
| CN | 101786445 | 7/2010 |

(Continued)

*Primary Examiner* — Nicolas A Arnett
(74) *Attorney, Agent, or Firm* — Leason Ellis LLP

(57) ABSTRACT

A sensing sealant liquid container for repairing an inflatable article, preferably a tyre, comprises a first portion produced by injection moulding and a second portion produced by injection moulding, the first and the second portion being connected to each other to delimit a volume inside which a sealant liquid is retained, an outlet tube for the sealant liquid when the container is pressurized and a sensor for verifying the functional connection of the tube to the inflatable article, and at least one track electrically connected to the sensor and co-moulded on one of the first and the second portion, the track defining a contact releasable electrical connection.

11 Claims, 6 Drawing Sheets

(56) References Cited

U.S. PATENT DOCUMENTS

| | | | | |
|---|---|---|---|---|
| 8,746,293 B2* | 6/2014 | Chou | ................... | B29C 73/025 |
| | | | | 141/38 |
| 9,221,221 B2* | 12/2015 | Lolli | ....................... | B60S 5/046 |
| 9,573,326 B2* | 2/2017 | Marini | .................. | B29C 73/166 |
| 2007/0221287 A1 | 9/2007 | Izumoto | | |

FOREIGN PATENT DOCUMENTS

| | | |
|---|---|---|
| CN | 102673531 | 9/2012 |
| DE | 102008031449 | 2/2009 |
| EP | 2030767 | 3/2009 |
| WO | WO 2005/084968 | 9/2005 |
| WO | WO 2007/102066 | 9/2007 |
| WO | WO 2009/019590 | 2/2009 |
| WO | WO 2009/027792 | 3/2009 |
| WO | WO 2015/022630 | 2/2015 |
| WO | WO 2015/114567 | 8/2015 |

\* cited by examiner

SENSING SEALANT LIQUID CONTAINER AND INFLATABLE ARTICLE REPAIR KIT COMPRISING THE SAME

CROSS-REFERENCE TO RELATED PATENT APPLICATIONS

This application is a U.S. National Phase Application under 35 U.S.C. § 371 of International Patent Application No. PCT/IB2017/053399, filed Jun. 8, 2017, which claims the priority of Italian Application No. 102016000058691, filed Jun. 8, 2016, which is incorporated by reference as if expressly set forth in its entirety herein.

TECHNICAL FIELD

The present invention relates to a sensing sealant liquid container and to a kit for repairing inflatable objects, in particular tyres, comprising said container.

BACKGROUND ART

Sensing sealant liquid containers are known to be connected to a base of a kit comprising a circuit programmed and/or designed to activate the compressor only if a signal of a correct attachment of a sealant container outlet tube to the tyre is detected. This signal is generated by means of the sensing container.

In particular, WO-A1-2007102066, filed on behalf of the same applicant, describes a sensing container comprising electrical interface terminals arranged in close proximity to a retention clip holding the container at the base of the kit and in a lower area of the container.

The need arises to have a more flexible positioning of the interface terminals on the sensing container.

DISCLOSURE OF INVENTION

The object of the present invention is to provide a container for a sealant liquid that can meet the above-mentioned requirement.

The object of the present invention is obtained by means of a sensing sealant liquid container according to claim 1.

BRIEF DESCRIPTION OF THE DRAWINGS

The invention will now be described with reference to the accompanying drawings, which illustrate an example of non-limiting embodiment, wherein.

BEST MODE FOR CARRYING OUT THE INVENTION

Figure 1:
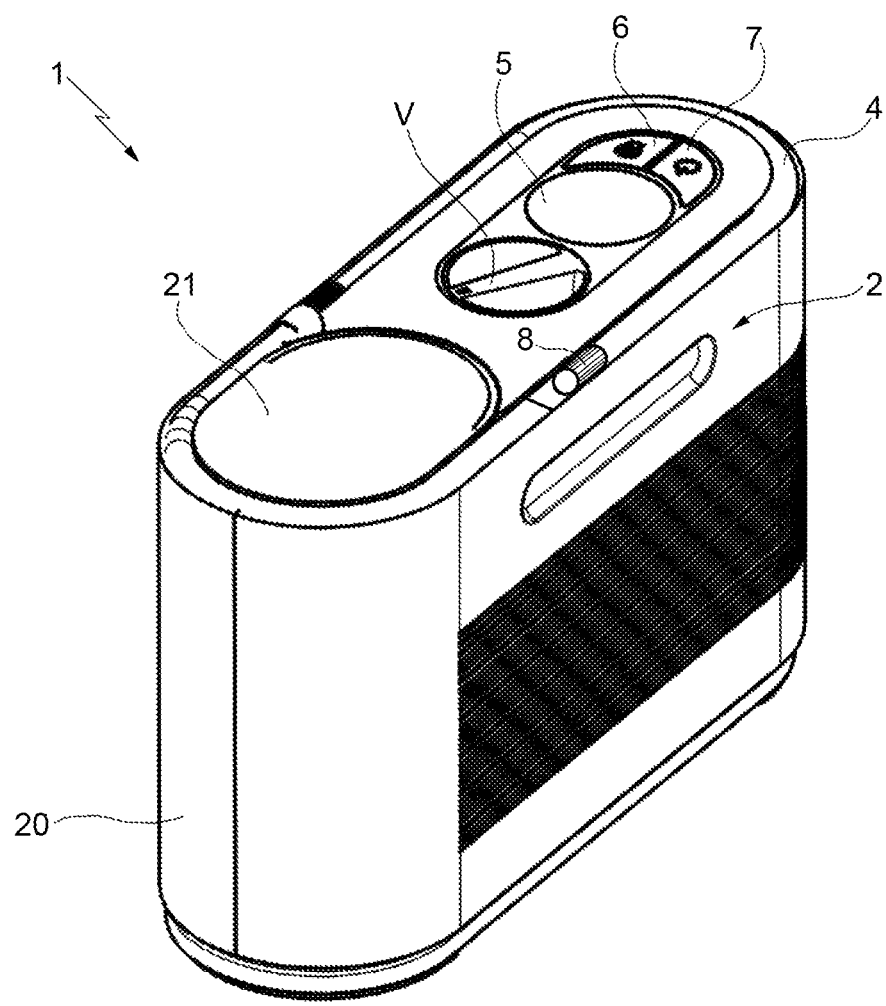
FIG. 1 is a perspective view of a kit comprising a sensing container according to the present invention.

In FIG. 1, 1 illustrates, as a whole, a portable tyre repair kit comprising a protective outer casing 2 for housing a compressor operated by an electrical motor and for delimiting a base of the kit, and a sensing container 3 connected in a releasable manner to the base to maintain a position of use and to receive, when the compressor is activated, a pressurized air flow capable of injecting the sealant liquid into the damaged tyre by means of a flexible tube 4 and subsequently inflating the tyre so as to allow a car to continue its journey. In order to adjust the pressure in the tyre, the kit 1 comprises a pressure gauge having an analog or digital screen 5 to indicate the detected pressure and a vent valve 6 to decrease the pressure in case the screen 5 indicates an excessive value.

The kit further comprises a known electrical or electronic circuit for the activation of the compressor, which generates a pressurized air flow only if at least two conditions are verified by the control circuit, i.e. verifying that a direct control signal is generated by the user, for example by way of pressing an ignition button 7 of the compressor and verifying that a signal is generated by means of the sensing container 3 when the flexible tube 4 is properly connected, for example screwed, to the tyre for injecting sealant liquid and/or pressurized air.

Preferably, the signal of the sensing container 3 is generated by means of electrical terminals in a threaded ring nut 8 which are short-circuited when the ring nut 8 is screwed onto the safety valve (not illustrated) of a tyre so as to reach a condition suitable for the injection of the sealant and for the inflation. In particular, the pressurized sealant liquid must not leak from the ring nut to prevent pollution, the ring nut must remain connected to the tyre valve during the entire injection and inflation operation and the ring nut must provide sufficient fluid tightness for the inflation of the tyre.

It is possible to use any sensor generating an electrical signal to verify the functional connection between the flexible tube 4 and the tyre valve. Preferably, a contact sensor is used and more preferably an electrical sensor that short-circuits two terminals on the ring nut 8 or an equivalent connector. When ring nut 8 is disconnected from the tyre valve, the terminals are electrically insulated one from the other, when the ring nut 8 is properly connected, the terminals are short-circuited and this generates an electrical signal. The short-circuit can be operated by a mobile element normally spaced apart from the terminals and capable of short-circuiting the same as a result of a movement induced by the contact with the tyre valve. An example of said embodiment is described in WO-A1-2007102066. Alternatively, since the tyre valve is made of an electrically conductive material, the electrical terminals are configured so as to be short-circuited when both are in contact with the tyre valve, as described, for example, in WO-A1-2009027792.

The signal is carried by the terminals along the flexible tube by means of electrical conductors insulated one with respect to the other even in the presence of the sealant liquid. This can be accomplished by electrical wires insulated by means of respective sheaths or by means of electrical conductors embedded in the walls of the tube. Preferably, a conductor faces inside the flexible tube 4 and is wet in use by the sealant liquid and the other conductor is placed on an outer surface of the tube. In this way, the conductors are insulated one from the other by the material of the flexible tube 4 and are spaced apart at least by the thickness of a tube wall. For example, it is possible that the conductors are made by means of a conductive silicone co-extruded with the wall of the flexible tube 4. For example, the flexible tube is made of a "R plus 4305" grade platinum-catalysed addition-curing solid silicone rubber and the conductors are made of a "R plus 573" grade electrically conductive HCR silicone rubber with an extrusion curing agent. More details are available in DE102008031449.

The flexible tube 4 is fitted, for example, by radial interference on an outlet connector 9 of the container 3. On the outlet connector 9 respective electrical tracks 10, 11 are defined, suitably connected to the respective conductors of the flexible tube 4 and shaped to convey the connection signal to the base of the kit 1.

The container 3 is made by way of connecting two or more portions produced by injection moulding and, once coupled, for example, by welding, the portions delimit an inner volume wherein the sealant liquid is retained by a closing unit. The closing unit must be opened for the injection of the sealant liquid and this can be done automatically following the pressurization of the closing unit by way of the air generated by the compressor, such as for example in WO-A1-2005084968, or by manual actuation by the user, such as for example in EP-A1-2030767. In particular, the inner volume does not comprise ducts, channels or the like inside the container and which lead the sealant towards the flexible tube 4 when the container 3 is pressurized. A further example of a closing unit provided on the container 3 is disclosed in patent application WO-A1-2015114567 wherein the inlet of the pressurized air and the outlet of the sealant liquid are arranged from opposite sides with respect to the inner volume of the container.

In particular, one or both of the tracks 10, 11 are co-moulded on the portion of the container defining the connector 9. According to the embodiment of FIG. 2, a first portion 12 of the container 3 defines the mechanical connection with the base of the kit 1 and the fluid connection with the compressor and a second portion 13 defines the connector 9 which is thus opposed to the mechanical connection of the container 3 with the base of the kit 1. Preferably, the second portion 13 defines an upper face 14 of the container 3 and an annular surface 15 which forms, together with the first portion 12, a lateral surface of the container 3.

The tracks 11, 12 extend both on the upper face 14 and on the annular surface 15.

Figure 3:
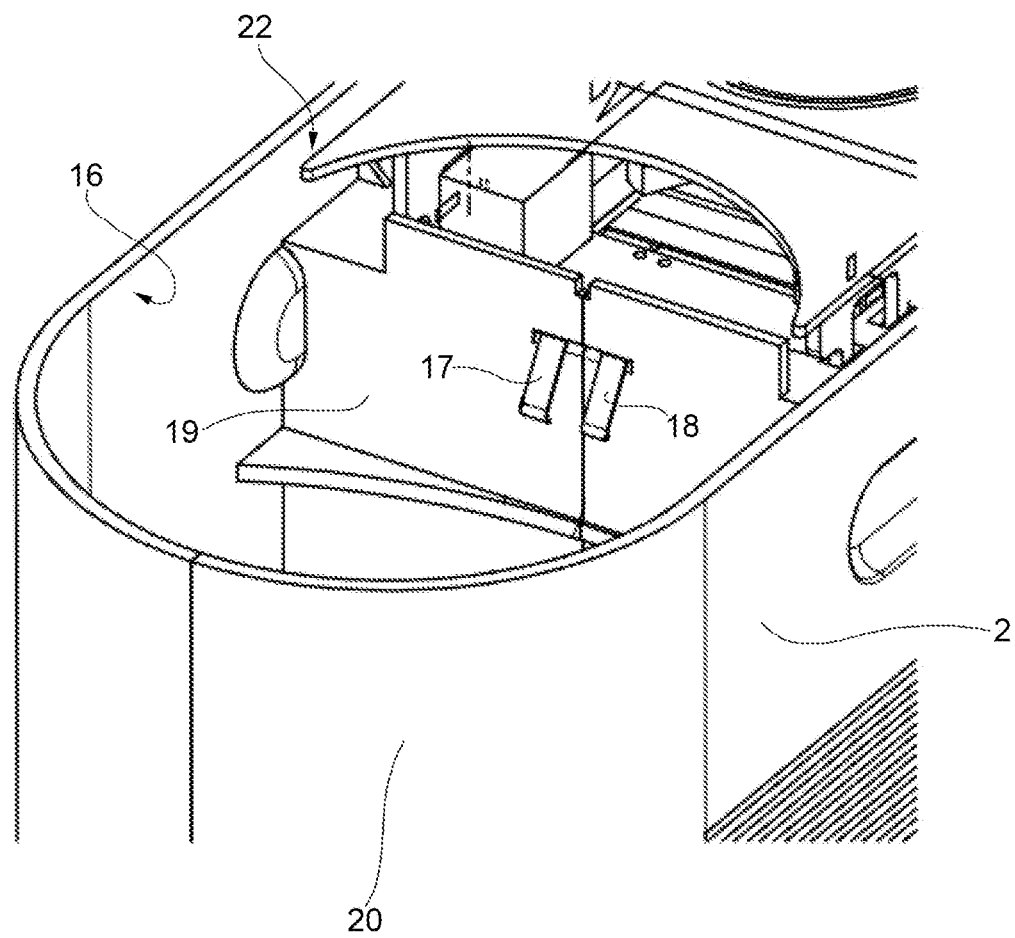
FIG. 3 is a perspective view of a detail of FIG. 1 with parts removed for clarity.

FIG. 3 illustrates a seat 16 inside which the container 3 is housed and electrical terminals 17, 18 inside the seat 16 to define an electrical connection with the tracks 11, 12. Preferably, the electrical terminals 17, 18 are elastic to exert pressure on the tracks 11, 12, in particular on the portion of the tracks 11, 12 arranged on the lateral surface of the container 3. For this purpose, the electrical terminals 17, 18 project inside the seat 16 with respect to a vertical wall 19, preferably interposed between the container 3 and the compressor. Preferably, the seat 16, being on the opposite side to the vertical wall 19 with respect to the container 3, is delimited by a perimeter wall 20, preferably curved, of the protective casing 2. The perimeter wall can be closed as shown in FIG. 1 or can have windows provided with through openings or windows closed by transparent materials.

Preferably, the seat 16 is permanently closed at the bottom by a bottom wall and is closed at the top, i.e. on the side of the upper face 14, by a removable cover 21. The removable cover 21 is preferably snap- or by interference-connected to the protective casing 2 and, preferably, defines a section of a peripheral groove 22 of the casing 2 in which the flexible tube 4 is fixed by interference in a storage configuration of the kit 1. The peripheral groove 22 is preferably arranged around the casing 2.

According to a preferred embodiment of the present invention, the removable cover 21 is connected in a releasable manner to the container 3 in a single and predetermined angular position. In addition, the removable cover 21, when connected to the container 3, can be closed in a single angular position, which corresponds to the orientation of the container 3 such that, the tracks 11, 12 will contact the terminals 16, 17 to transmit the connection signal of the container when the flexible tube 4 is connected to the tyre.

According to the embodiment of FIG. 3, the removable cover can be connected in a single and predetermined angular position by means of a shape coupling. This can be obtained by shape-coupling the cover 21 with the casing 2, both because the section of the groove 22 defined by the removable cover 21 has a single correct position to house the tube 4 when the latter is not in use, and because the outline of the removable cover 21 is non-axially symmetrical; and because the combination of the container 3 and the cover 21 mounted on the container 3 is non-axially symmetrical, for example because the cover 21 has a projection in a transverse direction of the container, for example in the direction in a plane perpendicular to a mounting direction of the container 3 in the seat 16. According to the embodiment of the figures, the mounting direction is substantially vertical. Furthermore, also the section of the groove 22 on the cover 21 is non-axially symmetrical.

Figure 4:
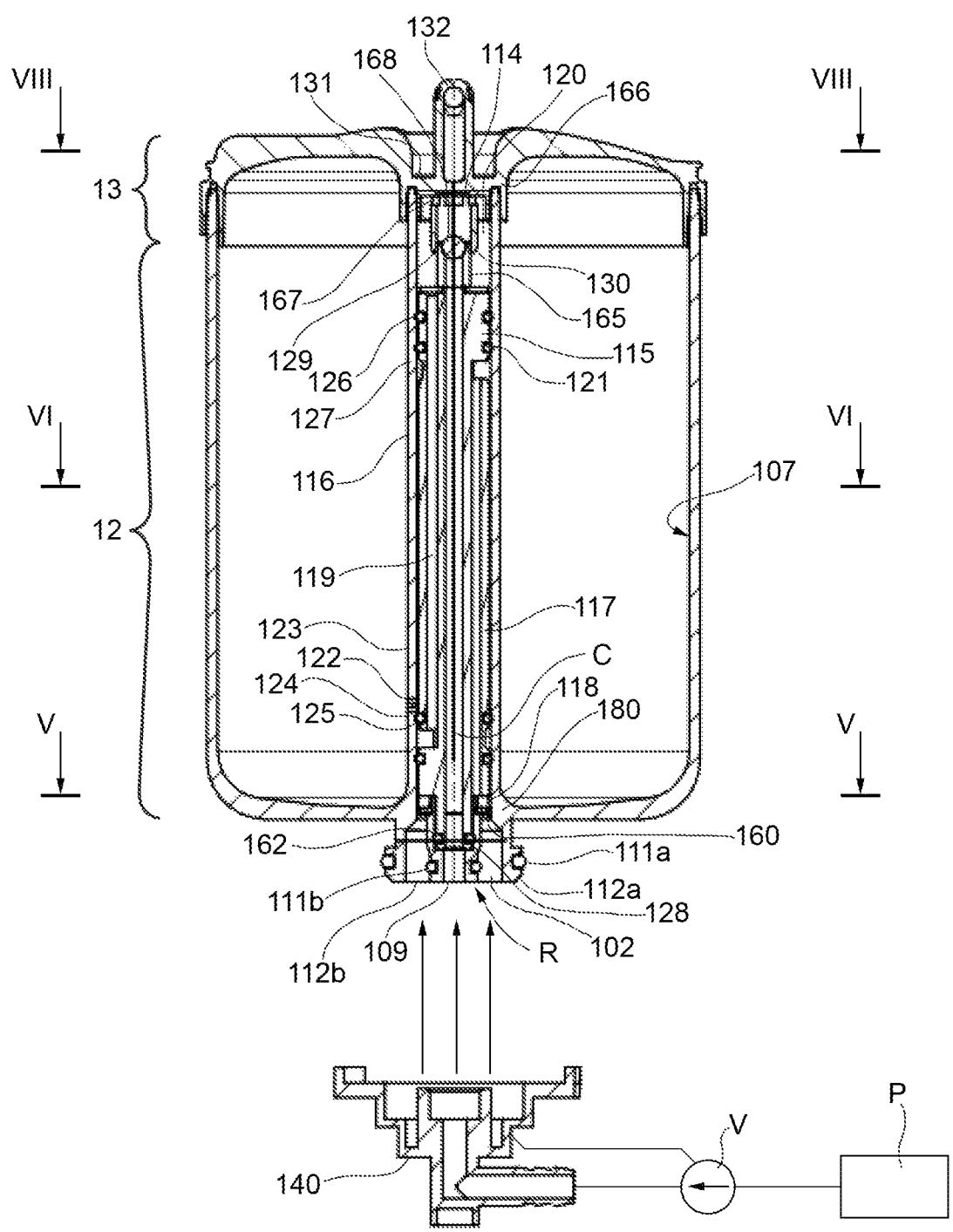
FIG. 4 is a section along a longitudinal plane of an embodiment of the sensing container.
Figure 5:
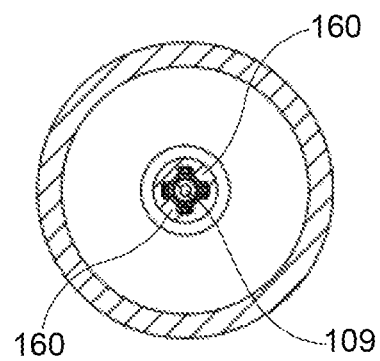
FIG. 5 is a section not to scale along the plane having a trace V-V in FIG. 4.

According to the embodiment of FIG. 4, the container 3 comprises an inlet port 102, a bottom 103 defining the inlet port 102, a lateral wall 104 extending from the bottom 103, and a head portion 105 opposite to the bottom 3 with respect to the lateral wall 104.

The upper face 14 is defined by a head wall 106 fixed to the lateral wall 104 to define an inner volume 107. The bottom 103, the lateral wall 104, and the head wall 106 define a casing to contain a predetermined amount of sealant liquid suitable to repair an inflatable article, such as a tyre.

The container 1 further comprises a second inlet port 109 fluidically arranged parallel to the tube 4.

From the longitudinal side opposite to the flexible tube 4, the inlet port 102 is surrounded by an annular wall 112a which carries a first seal ring 111a, e.g. an O-ring, and the second inlet port 109 is surrounded by a second annular wall 112b which carries a second seal ring 111b. The inlet port 102 is ring-shaped and surrounds, being concentric, the second inlet port 109.

The inlet ports 102, 109 and the annular walls 112a, 112b define a projection R of the bottom 103 which preferably snap connects to a base of a repair kit as will be described below.

In the container 3, the inner volume 107 houses a closing unit 113 which connects the inlet port 102 to an outlet port 114 and comprises a mobile element 115 configurable in a closing position wherein the sealant liquid is retained and stored in the inner volume 107 and the container 3 can be available for use, and an opening position reached following pressurization of the inlet port 102 wherein inlet port 102 and outlet port 114 are connected by means of the inner volume 107. The outlet port 114 is in turn connected to the tube 4 to inject the sealant liquid into a tyre when the inlet port 102 is pressurized and the closing unit 113 is configured in the opening position. The inlet port 102 and the outlet port 114 are on opposite sides with respect to the inner volume 107 and the sealant liquid, during injection, passes through at least a section, from the bottom 103 to the head wall 106, inside the closing unit 113.

In the closing position of the mobile element 115, the outlet port 114 is connected to the second inlet port 109 by means of a duct C defined by the mobile element itself. Both in the opening position and in the closing position of the mobile element 115, the duct C is fluidically insulated with respect to the inlet port 102 so as to avoid bypass when the pressurized air must be sent to the inner volume 107. According to an embodiment, in order to obtain said function, the annular wall 112b is connected to the annular wall 112a by one or more radial bridges 160 and the mobile element 115 comprises a projection 161 sliding in the annular wall 112b, a seal ring 162 being interposed and being the duct C partially defined by the projection 161. In any functioning position of the mobile element 115, the projection 61 slides in the annular wall 112b and the seal ring 162 prevents pressurized air from entering the inlet port 102 through the duct C and pressurized air, entering the second inlet 109, from escaping towards the inlet port 102.

Preferably, the mobile element 115 moves in a rectilinear direction defined by way of a guide 16 preferably arranged between the inlet 102, 109 and outlet 114 ports. Advantageously, the guide 116 is tubular and houses the mobile element 115 which carries a plurality of seal rings sliding on the guide 116.

The mobile element 115 defines a first passage 117, in particular a duct, which, leads into an inlet 118 of the closing unit 113 and a second passage 119, preferably a duct, which leads into an outlet 120 of the closing unit 113. In addition, in the opening position (not illustrated), the passage 117 leads into the inner volume 107 through an opening 121 defined by the guide 116 as well and the passage 19 leads into the inner volume 107 through an opening 122 defined by the guide 16 as well. Preferably, the opening 121 is closer to the outlet 120 of the opening 122 in the longitudinal direction of movement of the mobile element 115 along the guide 16. Preferably, the ducts 117, 119 are on opposite transverse sides with respect to the duct C.

The stroke of the mobile element 115 and the position of the seal rings depends on the position of the openings 121, 122. In the position of FIG. 4, the seal rings 123, 124 are longitudinally spaced apart to be on opposite sides with respect to the opening 122 and thus preventing the sealant liquid from leaking through the guide 116. A third seal ring 125 is proximal to the inlet 118 with respect to the seal rings 123, 124 so as to convey the sealant liquid in the passage 119 when the mobile element 115 is in the opening position.

The mobile element 15 also carries two more seal rings 126 and 127 spaced apart in a direction so as to be located on opposite sides with respect to the opening 121 when the mobile element 115 is in the closing position (FIG. 4). The guide 116 has continuous walls at least in the contact area with the seal rings 123-127 so that, when the closing unit 113 is in the closed position, the openings 121, 122 are sealed with respect to the inlet 118 and to the outlet 120. Furthermore, in the open position, the seal ring 125 insulates the opening 122 from the inlet 118.

The container 1 can be produced by friction welding of components made by injection and moulding of a plastic material. Preferably, the bottom 103, the lateral wall 104, the annular walls 112a, 112b, the radial bridges 160 and the guide 116 are produced in a single hollow body. The wall 106 is produced by moulding in a single body. Furthermore, the mobile element 115 is mounted in the guide 116 in the closing position and the predetermined amount of sealant liquid for repair is poured into the hollow body defined by the bottom 103 and the lateral wall 104. Finally, the head wall 106 is welded on said hollow body.

In order to delimit the closing position of the mobile element 115 in particular during the assembly, a stop 128 is provided, preferably arranged within the projection R, even more preferably defined by the annular wall 112b, to receive in abutment the projection 161.

In order to delimit the open position of the mobile element 115, a stop 129 is preferably provided, defined by a tubular element 130 of the head wall 6 concentric to the guide 116. Similarly, to the structure of the mobile element 115 near the inlet ports 102, 109, the mobile element 115 comprises a second projection 165 defining a portion of the duct C and sliding inside the tubular element 130. The guide 116 has a diameter larger than that of the tubular element 130 and is fitted in a dedicated embossment 166 of the head 106 to be welded or otherwise connected in use in a fluid-tight manner for sealant liquid or compressed air when the lateral wall 104 is also welded. The outlet 120 of the closing unit 113 has an annular shape and fluidically communicates with the outlet port 114 by means of gaps 167 carried by the lateral wall 130 and the projection 165 is surmounted by a shutter 168. When the gaps 167 are pressurized, the pressure closes the shutter 168 to prevent a flow from flowing through the duct C towards the second inlet port 109. When duct C is pressurized, the shutter 168 is open and duct C is connected to the outlet port 114.

The head 106 further defines a cavity 131 of the head wall 6 facing the outside environment. Preferably, within the cavity 131, an end portion of the tube 4 is mechanically connected, for example by radial interference, to a connector 132.

In use, the projection R of the container 1 is fluidically and mechanically coupled in a releasable manner on a connector 140, which connects the first and second inlet ports 102, 109 to a compressor P by means of a selector valve V. The container 1 is produced and is connected to the connector 140 with the mobile element 115 in the closing position (FIG. 4). When the compressor is activated and the selector valve sends pressurized air to the inlet port 109 and at the same time disconnects the inlet port 102 from the compressor P (FIG. 4), the outlet port 114 and the connector 132 receive pressurized air and the shutter 168 is open. The outlet 120 and the passage 119 are also pressurized, but seal ring 124 prevents air leaks towards the inner volume 107. In addition, the pressurization of the outlet 120 increases the load of the projection 161 against the stop 128 but does not move the mobile element 115.

When the selector valve V is switched to supply pressurized air to the inlet port 102, the mobile element moves towards the head 106 until the passage 117 is in fluid communication with the inner volume 107. When the passage 117 leads to the opening 120 and, at the same time the passage 119 leads to the opening 122, the inner volume 107 is pressurized and the pressure inside the container 3 pushes the sealant liquid towards the outlet port 114 through the opening 122, which is located near the bottom 103. As the sealant liquid is extracted from the inner volume 107, the pressurization of the outlet 120 by means of the gaps 167 compresses the shutter 168 so that the sealant liquid first, and pressurized air after are directed towards the outlet port 114 and not through the duct C. The shutter 68 therefore operates as a check valve and may or may not be pre-loaded in the closing position by a spring.

If in said situation the user switches the valve V to the inflation-only position (illustrated in FIG. 4), the pressurized air may flow backward through the first and second passages 117, 119. To reduce the amount of said air flow or to block said air flow, the container 3 comprises a check valve 180 arranged along the fluid line between the inlet port 102 and the gaps 167. Preferably, the check valve is a membrane and is arranged between the inlet port 102 and the first passage 117, so as to hinder the air possibly leaving the inlet 118. Preferably, the membrane valve rests on the bridges 160.

Figure 7:
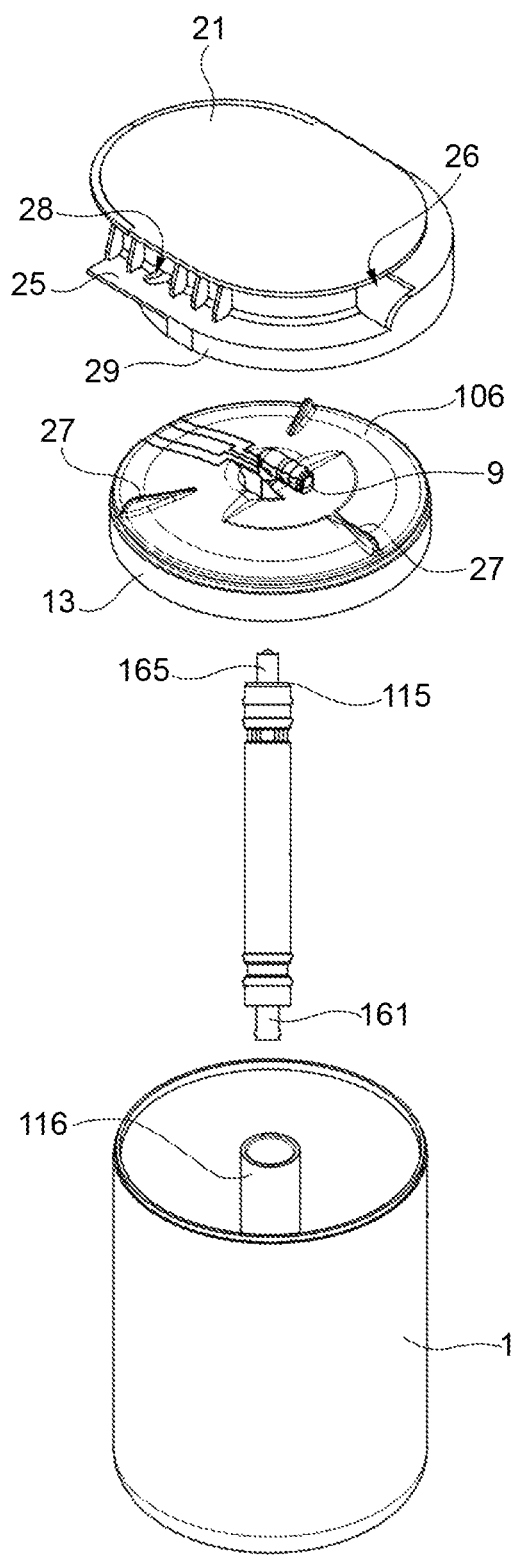
FIG. 7 is an exploded view of the container of FIG. 4.
Figure 8:
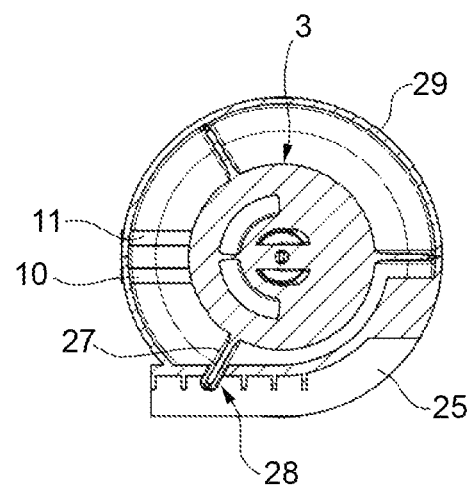
FIG. 8 is a not to scale section according to the plan having a trace VIII-VIII in FIG. 4, of the container illustrated in FIG. 7.

FIG. 7 illustrates, furthermore, how the cover 21 is non-axially symmetrical for the shape coupling purposes in order to close the seat 16. In particular, a wall 25 follows a profile, preferably "j"-shaped, which couples in the seat 16 in a single angular position. Preferably, the wall 25 is the bottom of a section of the groove 22 for the flexible tube 4. In order to uniquely define the angular position between the sensing container 3 and the cover 21, the cover 21 comprises a through seat 26 to house a section of the flexible tube 4 between the connector 9 and the groove 22. Furthermore, a shape coupling is provided to prevent rotation of the container 3 with respect to the cover 21. Preferably, the upper face 14 of the sensing container 3 defines a projection 27 engaging in a seat 28 of the cover. At least either the projection 27 and/or the seat 28 is non-axially symmetrical with respect to an axis of the lateral wall 104. In the example of embodiment, the seat 28 is one only and eccentric with respect to an axis of the lateral wall 104 and, therefore, is non-axially symmetrical. In the embodiment of FIG. 7, the housing of the flexible tube 4 in the seat 26 defines, due to the orientation of an elbow of the connector 9, a general angular orientation of the container with respect to the cover 21 and the coupling between the projection 27 and the seat 28 defines a delimitation of the relative angular stroke so as to allow the electrical coupling with the terminals 17, 18 when the container 3 and the cover 21 are in the position of use. According to the embodiment of FIG. 8, the cover 21 is fixed to the container 3 in a releasable manner by a snap or pressure connection between a collar 29 of the cover and the container 3, in particular, a shaped annular rim of the container 3. In greater detail, the projection 27 and the seat 28 are coupled along the pressure or snap coupling direction between the container 3 and the cover 21. However, it is possible to provide that the singular angular position of the container 3 with respect to the cover 21 can be obtained in other ways.

In use, the sensing container 3 is mounted by means of the cover 21 in the angular position uniquely suited for the electrical connection by contact with the electrical terminals 17, 18. The housing movement in the seat 16 preferably follows a single direction, in the example of the figures the one parallel to the axis of the lateral surface 104, and at least said direction is snap-locked by means of the coupling between the connector 140 and the projection R. The cover 21 contributes to the final locking of the sensing container 3, in particular of the head surface 106 inside the seat 16.

When the user selects the selector valve V in the inflation-only position schematically illustrated in FIG. 4, the pressurized air passes through the duct C and mobile element 115 remains in the position which closes the inner volume 107.

When the selector valve V is switched by the user to supply the inlet port 102, the mobile element 115 is moved by pressure and the sealant liquid flows in the passage 119 towards the flexible tube 4.

After the sealant has been injected, the sensing container 3 together with the flexible tube 4 are replaced.

The advantages that the container 3 according to the present invention allows to obtain are as follows.

The co-moulding of the conductive tracks 10, 11 on the elements defining the inner volume 109 keeps the number of components low and increases the geometric flexibility of the container, which can have many embodiments, with particular reference to the position of the inlet and outlet of the pressurized air. In particular, it is possible to produce a container having the air inlet separated from the air outlet by means of a portion or the entire inner volume 107.

The positioning of the conductive tracks 10, 11 in the head and/or lateral area of the sensing container 3 allows a simplified visual inspection of the surface cleaning so as to ensure electrical conductivity.

The cover 21 simplifies the electrical connection when the sensing container 3 is mounted by the user in the seat 16.

The collar 29 defines an abutment to press the container 3 against the terminals 17, 18 when the cover 21 is closed.

It is also clear that it is possible to provide modifications or alternatives to the container 1 described and illustrated herein without departing from the scope of protection as described in the appended claims.

Figure 2:
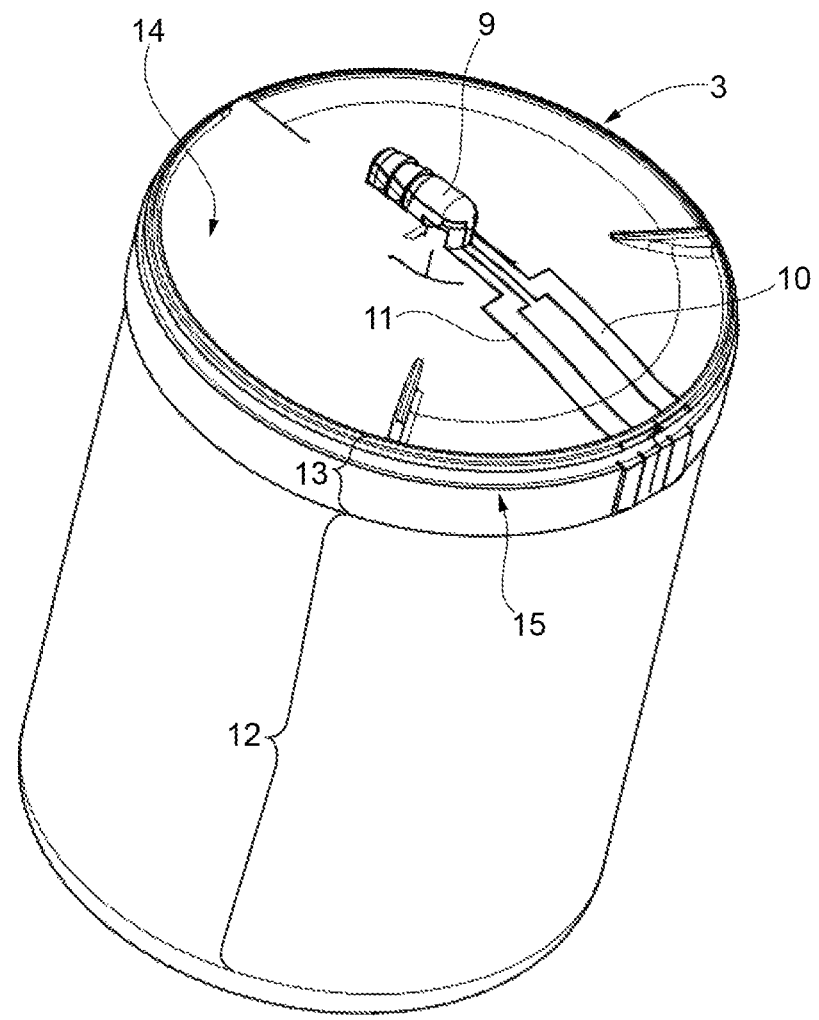
FIG. 2 is a perspective view of a sensing container according to the present invention.

The portions 12 and 13 of the container 3 are welded, in the example of FIG. 2, by rotation and/or friction preferably along the peripheral lateral surface having a larger diameter. It is however possible that the welding is performed in other areas of the container 3.

The sensor 8 may be of a different type from the one described and, in this case, it is possible that the transmission of the compressor control signal is possible also by means of a single track 10 and electrical contact 17.

The cover 21 mainly allows to define the angular position of the sensing container 3 with respect to the terminals. To said purpose, the cover 21 can comprise openings of various sizes, also such to allow a user to see portions of the upper face 14.

Figure 6:
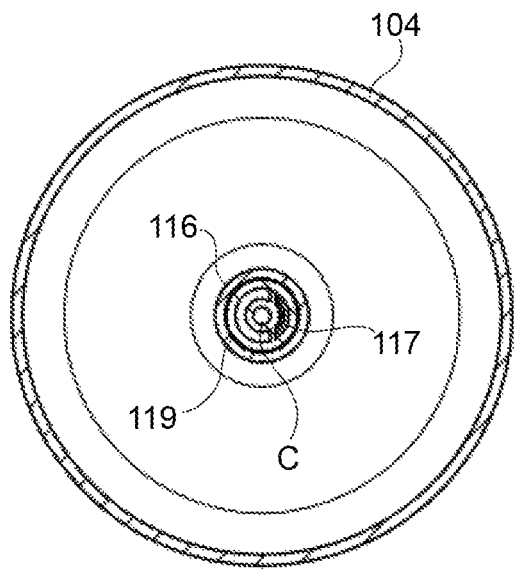
FIG. 6 is a section not to scale along the plan having a trace VI-VI in FIG. 4.

As illustrated in FIG. 6, the cross section of passage 117 for pressurized air has a smaller area with respect to that of the passage 119 which provides sealant liquid. Other configurations are possible.

The invention claimed is:

1. A sensing sealant liquid container for repairing an inflatable article comprising a first portion (12) produced by injection moulding and a second portion (13) produced by injection moulding, the first and the second portion being connected to each other to delimit a volume inside which a sealant liquid is retained, an outlet tube (4) for the sealant liquid when the container (3) is pressurized and a sensor (8) for verifying the functional connection of the tube (4) to the inflatable article, and at least one track (10, 11) electrically connected to the sensor (8) and co-moulded on one of the first and second portion (12, 13), the track defining (10, 11) a contact releasable electrical connection.

2. A container according to claim 1, characterized in that the contact release electrical connection is arranged on a lateral surface (15) of the container.

3. A container according to claim 2, characterized in that the first portion (12) comprises a connection (R) for pressurizing the container and in that the second portion (13) comprises both a connector (9) fluidly connected to the tube (4) and the track (10, 11).

4. A container according to claim 1, characterized in that the sensor (8) is short-circuited when the tube (4) is functionally connected to the inflatable article.

5. A container according to claim 1, characterized in that the container includes a releasable mechanical connection (27, 28) to couple a cover (21) in a unique predefined angular position and define the angular position of the contact release electrical connection with respect to the cover (21).

6. A kit for the repair and inflation of inflatable articles comprising a protective outer casing (2), a container (3) according to claim 1 housed in a seat (16) of the casing (2), a compressor housed in the casing (2) and functionally connected in a releasable manner to the container (3), and an electrical contact (17, 18) arranged on a wall (19) to cooperate with the electrical track (10, 11) when the container (3) is in the position of use; the compressor being arranged on the opposite side of the container (3) with respect to the wall (19) and being operable to generate pressurized air and inject sealant liquid on the basis of the signal generated by the sensor (8) only if the tube (4) is connected.

7. A kit according to claim 6, characterized in that a cover (21) closes the seat (16); the cover being removable; and, when the cover closes the seat (16), the cover positions the container (3) so as to establish an electrical connection between the electrical track (10, 11) and the electrical contact (17, 18).

8. A kit according to claim 7, characterized in that the casing (2) defines a groove (22) for housing the tube (4) by interference when not in use and in that the cover (21) defines a non-axially symmetrical section of the groove (22).

9. A kit according to claim 7, characterized in that the cover (21) comprises an abutment (29) to press the container (3) against the terminal (17, 18) when the cover (21) is closed.

10. A kit according to claim 7, characterized in that the cover (21) is snap- or pressure-fitted in the seat (16).

11. A container according to claim 1, wherein the inflatable article comprises a tyre.

\* \* \* \* \*